United States Patent
Han et al.

(10) Patent No.: US 9,628,506 B1
(45) Date of Patent: Apr. 18, 2017

(54) SYSTEMS AND METHODS FOR DETECTING SECURITY EVENTS

(71) Applicant: Symantec Corporation, Mountain View, CA (US)

(72) Inventors: Yufei Han, Antibes (FR); Yun Shen, Bristol (GB)

(73) Assignee: Symantec Corporation, Mountain View, CA (US)

( * ) Notice: Subject to any disclaimer, the term of this patent is extended or adjusted under 35 U.S.C. 154(b) by 13 days.

(21) Appl. No.: 14/752,146

(22) Filed: Jun. 26, 2015

(51) Int. Cl.
*G06F 11/00* (2006.01)
*H04L 29/06* (2006.01)

(52) U.S. Cl.
CPC ........ *H04L 63/1441* (2013.01); *H04L 63/145* (2013.01); *H04L 63/1416* (2013.01); *H04L 63/1483* (2013.01); *H04L 63/20* (2013.01)

(58) Field of Classification Search
CPC . H04L 63/1441; H04L 63/1483; H04L 63/20; H04L 63/145; H04L 63/1416
USPC .......................................................... 726/23
See application file for complete search history.

(56) References Cited

U.S. PATENT DOCUMENTS

| | | | | |
|---|---|---|---|---|
| 7,937,761 | B1* | 5/2011 | Bennett | H04L 63/1433 713/153 |
| 8,478,708 | B1* | 7/2013 | Larcom | G06Q 10/10 706/52 |
| 2005/0182765 | A1* | 8/2005 | Liddy | G06F 17/30699 |
| 2007/0067845 | A1* | 3/2007 | Wiemer | G06F 21/577 726/25 |

OTHER PUBLICATIONS

"Nearest neighbor graph", https://en.wikipedia.org/wiki/Nearest_neighbor_graph, as accessed Jun. 4, 2015, Wikipedia, (Oct. 3, 2009).

Subramanya, Amarnag et al., "Entropic Graph Regularization in Non-Parametric Semi-Supervised Classification", Twenty-Third Annual Conference on Neural Information Processing Systems (NIPS), Vancouver, B.C., Canada, (2009).

Grandvalet, Yves et al., "Semi-supervised Learning by Entropy Minimization", Proceedings of Advances in Neural Information Processing Systems 17, (NIPS 2004), Vancouver, B.C., Canada, (2004).

(Continued)

*Primary Examiner* — Mohammed W Reza
(74) *Attorney, Agent, or Firm* — FisherBroyles LLP (57) ABSTRACT

A computer-implemented method for detecting security events may include (1) identifying facets of candidate security events detected by a network security system, (2) assigning each of the facets of the candidate security events to one of multiple groups of facets to create permutations of the facets, (3) comparing, for each group of facets, the candidate security events according to a similarity algorithm that indicates similarity between the candidate security events, (4) generating, for each group of facets, a weak classifier for detecting security events based on a nearest neighbor graph, and (5) performing, by the network security system, a remedial action in response to classifying a candidate security event as a security threat by applying a combination of the weak classifiers for the groups of facets to the candidate security event. Various other methods, systems, and computer-readable media are also disclosed.

20 Claims, 7 Drawing Sheets

(56) References Cited

OTHER PUBLICATIONS

Nadler, Boaz et al., "Semi-Supervised Learning with the Graph Laplacian: The Limit of Infinite Unlabelled Data", Proceedings of Advances in Neural Information Processing Systems 22, (NIPS 2009), USA, (2009).

Abe, Naoki et al., "Outlier detection by active learning", Proceedings of the 12th ACM SIGKDD International Conference on Knowledge Discovery and Data Mining, KDD '06, Philadelphia, PA, USA, (Aug. 20-23, 2006), pp. 504-509.

Lane, Terran, "A Decision-Theoretic, Semi-Supervised Model for Intrusion Detection", Machine Learning and Data Mining for Computer Security, Springer, London, (2006), pp. 157-177.

* cited by examiner

SYSTEMS AND METHODS FOR DETECTING SECURITY EVENTS

BACKGROUND

Individuals and organizations typically seek to protect their computing resources from network attacks and other security threats. Many of these security threats will take the form of malicious emails, such as spear phishing emails. Spear phishing emails generally use specific knowledge of individuals and their organizations to trick victims into disclosing sensitive information or installing malware on their computers.

To protect their computing resources and users from the security threats, individuals and organizations may employ security software products that attempt to distinguish between benign events and malicious events. For example, the security software products may attempt to distinguish between benign emails and spear phishing emails. Unfortunately, traditional systems and methods for detecting spear phishing emails may suffer from several drawbacks. The traditional systems may strain labor and other resources of a security software product vendor because the traditional systems may operate upon a large number of manually-labeled emails. Accordingly, the instant disclosure identifies and addresses a need for additional and improved systems and methods for detecting security events.

SUMMARY

As will be described in greater detail below, the instant disclosure generally relates to systems and methods for detecting security events by, for example, (1) creating multiple weak classifiers based on random permutations of security event facets and then (2) applying a combination of some or all of the weak classifiers to candidate security events to obtain a finalized security classification. In one example, a computer-implemented method for detecting security events may include (1) identifying facets of candidate security events detected by a network security system, (2) assigning each of the facets of the candidate security events to one of multiple groups of facets to create permutations of the facets, (3) comparing, for each group of facets, the candidate security events according to a similarity algorithm that indicates similarity between the candidate security events, the similarity algorithm indicating similarity according to the facets specific to the respective group, (4) generating, for each group of facets, a weak classifier for detecting security events based on a nearest neighbor graph that connects each node of the graph to a nearest neighbor according to the respective similarity algorithm, and (5) performing, by the network security system, a remedial action in response to classifying a candidate security event as a security threat by applying a combination of the weak classifiers for the groups of facets to the candidate security event.

In one embodiment, the candidate security events include messages. In further embodiments, the messages include emails. In one embodiment, the facets include (1) a text facet, (2) an origin facet, (3) a destination facet, and/or (4) an attachment facet.

In one example, generating, for each group of facets, the weak classifier may include tuning parameters of the weak classifier. In some examples, tuning parameters of the weak classifier may include forcing a degree of similarity between a security score for a node of the nearest neighbor graph and a security score of a neighbor of the node to satisfy a similarity threshold. In further examples, tuning parameters of the weak classifier may include minimizing a level of information entropy for security scores assigned to nodes of the nearest neighbor graph.

In one embodiment, the computer-implemented method may further include performing, after performing an initial round of tuning and then applying the combination of the weak classifiers, a subsequent round of tuning that begins with security scores resulting from applying the combination of the weak classifiers. In some examples, applying the combination of the weak classifiers for the groups of facets to the candidate security event may include giving each of the weak classifiers a vote on a security score for the candidate security event. In further examples, assigning each of the facets of the candidate security events to one of multiple groups of facets to create permutations of the facets is performed on a random basis such that each of the facets is randomly assigned to one of the multiple groups.

In one embodiment, a system for implementing the above-described method may include (1) an identification module, stored in memory, that identifies facets of candidate security events, (2) an assignment module, stored in memory, that assigns each of the facets of the candidate security events to one of multiple groups of facets to create permutations of the facets, (3) a comparison module, stored in memory, that compares, for each group of facets, the candidate security events according to a similarity algorithm that indicates similarity between the candidate security events, the similarity algorithm indicating similarity according to the facets specific to the respective group, (4) a generation module, stored in memory, that generates, for each group of facets, a weak classifier for detecting security events based on a nearest neighbor graph that connects each node of the graph to a nearest neighbor according to the respective similarity algorithm, (5) a performance module, stored in memory, that performs a remedial action in response to classifying a candidate security event as a security threat by applying a combination of the weak classifiers for the groups of facets to the candidate security event, and (6) at least one physical processor configured to execute the identification module, the assignment module, the comparison module, the generation module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify facets of candidate security events detected by a network security system, (2) assign each of the facets of the candidate security events to one of multiple groups of facets to create permutations of the facets, (3) compare, for each group of facets, the candidate security events according to a similarity algorithm that indicates similarity between the candidate security events, the similarity algorithm indicating similarity according to the facets specific to the respective group, (4) generate, for each group of facets, a weak classifier for detecting security events based on a nearest neighbor graph that connects each node of the graph to a nearest neighbor according to the respective similarity algorithm, and (5) perform, by the network security system, a remedial action in response to classifying a candidate security event as a security threat by applying a combination of the weak classifiers for the groups of facets to the candidate security event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting security events. As will be explained in greater detail below, the disclosed systems and methods may improve on other systems for detecting security events such as spear phishing emails by enabling vendors of security software products to reduce the amount of human labor in manually attributing or labeling candidate emails. The disclosed systems and methods may also improve detection accuracy, including achieving a 0.01% false positive rate using only 1% of classified emails, as discussed further below.

Figure 1:
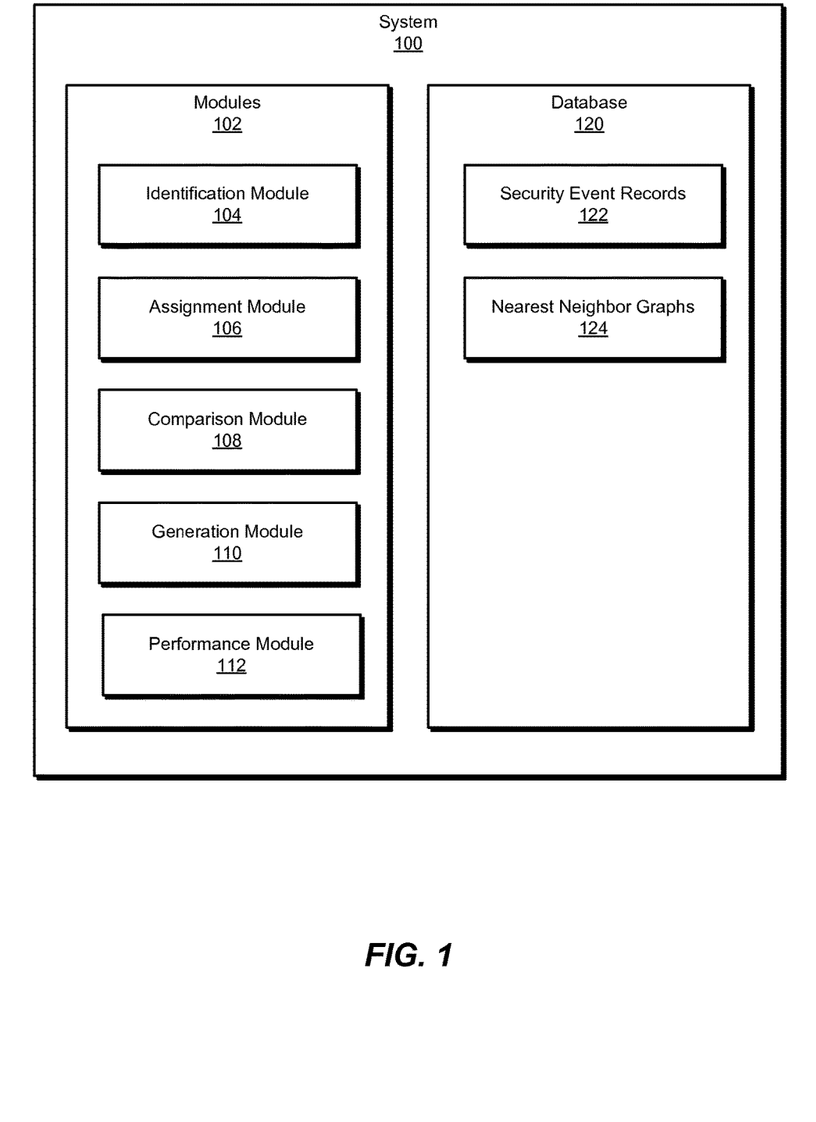
FIG. 1 is a block diagram of an exemplary system for detecting security events.
Figure 2:
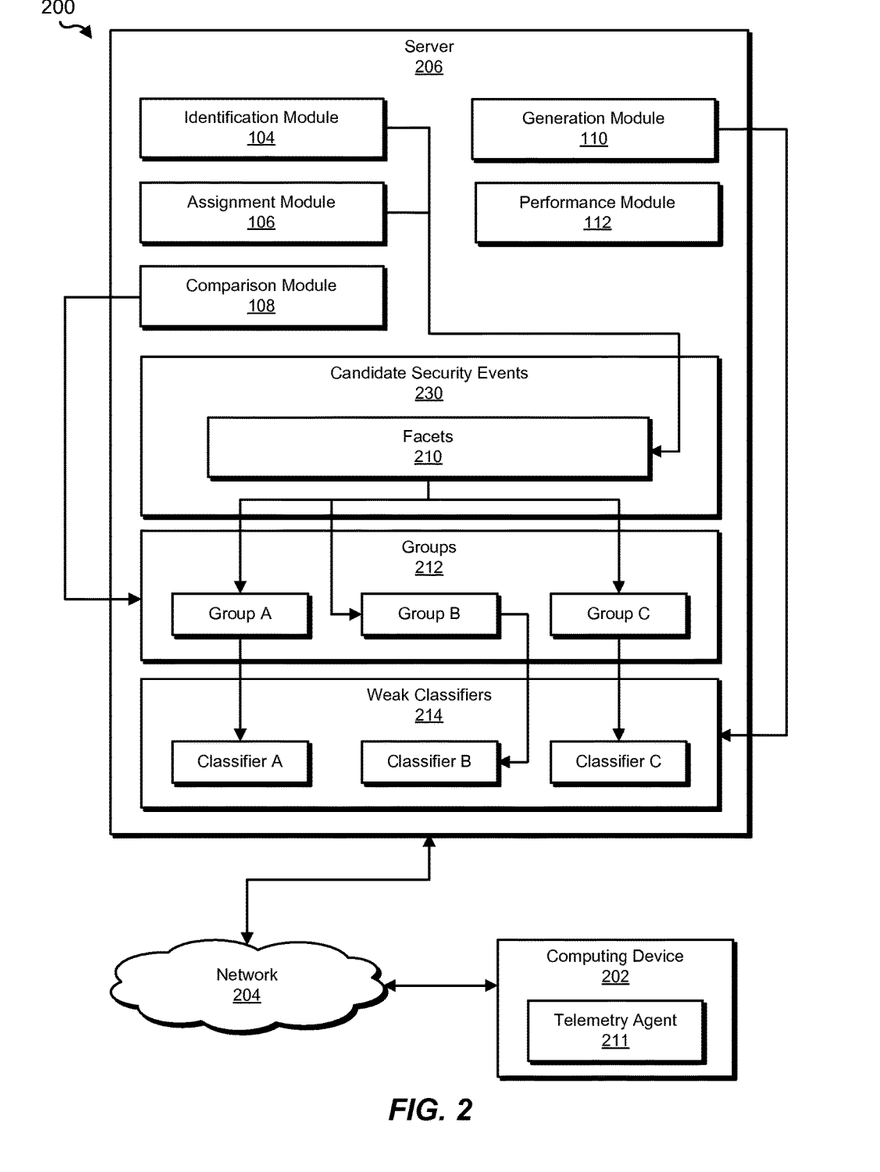
FIG. 2 is a block diagram of an additional exemplary system for detecting security events.

The following will provide, with reference to FIGS. 1-2, detailed descriptions of exemplary systems for detecting security events. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting security events. As illustrated in this figure, exemplary system 100 may include one or more modules 102 for performing one or more tasks. For example, and as will be explained in greater detail below, exemplary system 100 may also include an identification module 104 that may identify facets of candidate security events detected by a network security system. Exemplary system 100 may additionally include an assignment module 106 that may assign each of the facets of the candidate security events to one of multiple groups of facets to create permutations of the facets. Exemplary system 100 may also include a comparison module 108 that may compare, for each group of facets, the candidate security events according to a similarity algorithm that indicates similarity between the candidate security events. The similarity algorithm may indicate similarity according to the facets specific to the respective group. Exemplary system 100 may additionally include a generation module 110 that may generate, for each group of facets, a weak classifier for detecting security events based on a nearest neighbor graph that connects each node of the graph to a nearest neighbor according to the respective similarity algorithm. Exemplary system 100 may also include a performance module 112 that may perform, as part of the network security system, a remedial action in response to classifying a candidate security event as a security threat by applying a combination of the weak classifiers for the groups of facets to the candidate security event. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store security event records 122, which may indicate metadata and other information about candidate security events as well as known and identified security events, as discussed further below. Database 120 may also be configured to store nearest neighbor graphs 124, which may indicate the nearest neighbor for each node on the graph where each node specifies a candidate security event, such as an unknown or unclassified email.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect security events. For example, and as will be described in greater detail below, identification module 104 may identify facets 210 of candidate security events 230 detected by system 200. Assignment module 106 may assign each of facets 210 of candidate security events 230 to one of multiple groups 212 of facets 210 to create permutations of facets 210. As further shown in FIG. 2, groups 212 may include a group A, a group B, and a group C. Comparison module 108 may compare, for each group of facets 210, candidate security events 230 according to a similarity algorithm that indicates similarity between candidate security events 230. The similarity algorithm may indicate similarity according to facets 210 specific to the respective group. Generation module 110 may generate, for each group of facets 210, a weak classifier (among weak classifiers 214 including a classifier A, a classifier B, and a classifier C) for detecting security events based on a nearest neighbor graph that connects each node of the graph to a nearest neighbor according to the respective similarity algorithm. Performance module 112 may perform a remedial action in response to classifying a candidate security event as a security threat by applying a combination of weak classifiers 214 for groups 212 of facets 210 to the candidate security event. Notably, system 200 may also include a telemetry agent 211 within computing device 202 (e.g., in various client devices in the field). Telemetry agent 211 may detect candidate security events 230 and report them to server 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of facilitating the classification of candidate security events or otherwise protecting users from security threats. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
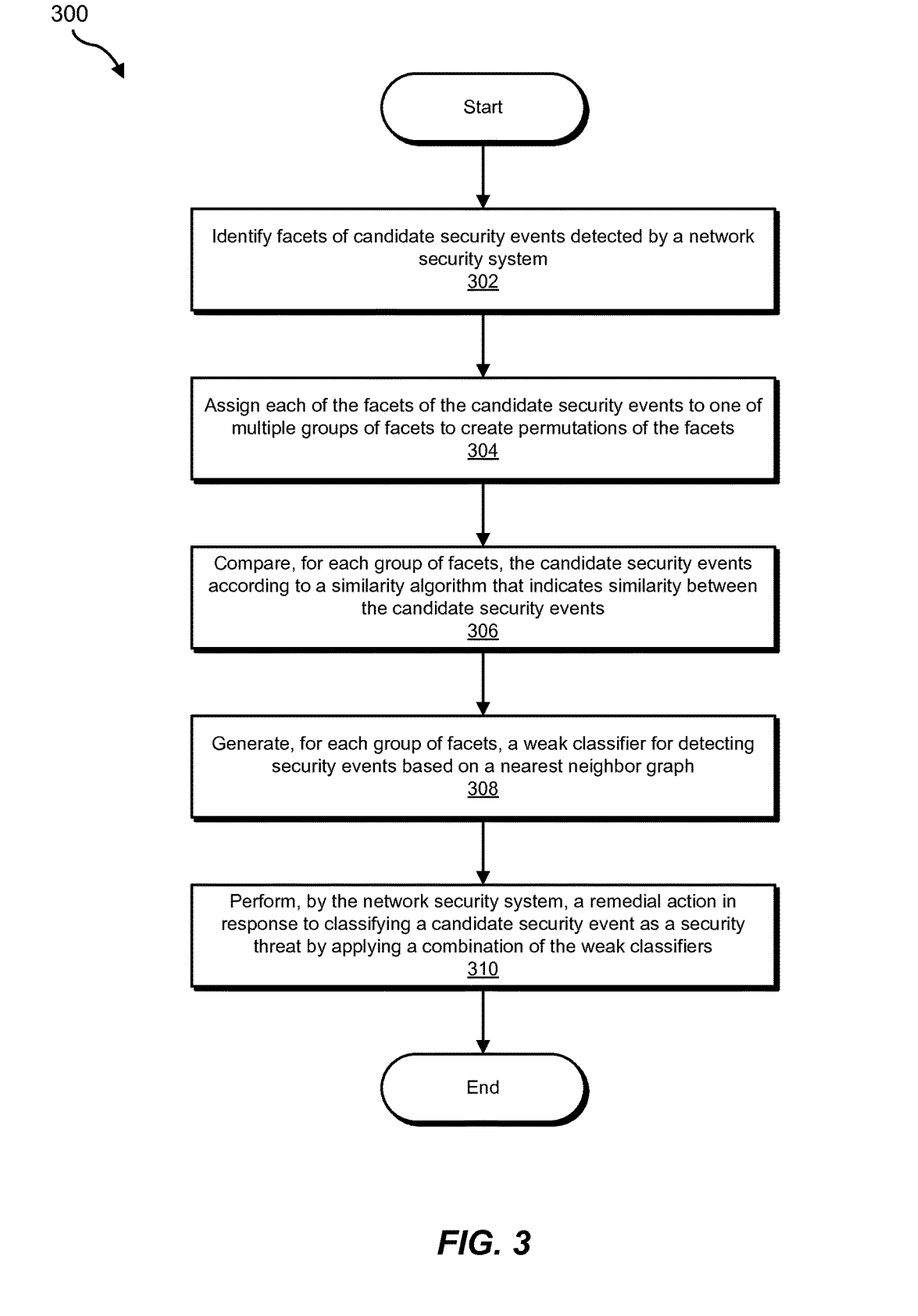
FIG. 3 is a flow diagram of an exemplary method for detecting security events.

FIG. 3 is a flow diagram of an exemplary computer-implemented method 300 for detecting security events. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify facets of candidate security events. For example, identification module 104 may, as part of server 206 in FIG. 2, identify facets 210 of candidate security events.

As used herein, the term "facets" generally refers to attributes, features, and/or characteristics. In one embodiment, the candidate security events correspond to unlabeled or previously unknown emails. Accordingly, the facets in this embodiment may further correspond to text facets (e.g., layout features, topic features, readability features, count function words, count of complex and simple words, average word length, and/or readability index scores, such as fog index scores), origin facets (e.g., name, IP address, domain, country, organization, and/or sent date, etc.), destination facets (e.g., name, IP address, domain, country, organization, and/or received date, etc.), and/or attachments facets (e.g., size, type, and/or family features), which may refer to attributes, features, and/or characteristics of the text of the email, the origin or sender of the email, the destination or recipient of the email, and/or any attachment attached to the email.

Moreover, as used herein, the term "candidate security events" generally refers to unlabeled or previously unclassified events in a network computing environment that are under evaluation by a network security system. In one embodiment, the candidate security events correspond to unlabeled or previously unknown emails, as discussed above. In other embodiments, the candidate security events may correspond to other network messages, computing resource access requests (e.g., website accesses), application executions, and/or any other events in a network computing environment that may be classified as either benign or malicious, as discussed further below. Moreover, the systems and methods herein may supplement the candidate security events with labeled or ground truth events to seed or initiate the creation of weak classifiers, as discussed further below.

Identification module 104 may identify the facets in a variety of ways. In some examples, identification module 104 may be programmed to detect predetermined or predefined facets of one or more types of candidate security events. For example, in the case of emails, identification module 104 may be programmed to identify one or more of the facets listed above, such as text facets and origin facets. In other examples, identification module 104 may use a machine learning algorithm to identify facets of candidate security events without being previously programmed to identify the specific facets. Notably, all machine learning for the disclosed methods may be implemented using machine learning system such as HADOOP and SPAR. In general, identification module 104 may extract values for each of the facets from metadata and other data associated with the candidate security events, such as security event records 122.

At step 304, one or more of the systems described herein may assign each of the facets of the candidate security events to one of multiple groups of facets to create permutations of the facets. For example, assignment module 106 may, as part of server 206 in FIG. 2, assign each of facets 210 of the candidate security events to one of multiple groups 212 of facets 210 to create permutations of facets 210.

As used herein, the term "group" of facets generally refers to a proper subset of the facets of the original data set of candidate security events 230. As one illustrative example, candidate security events 230 may have facets including attachment facets, origin facets, and destination facets. Accordingly, a group of the facets may correspond to the subset that includes the attachment facets and the origin facets without the destination facets. In this way, the original list of facets 210 may be divided into subsets or permutations, such as group A, group B, and group C in FIG. 2, as discussed above.

Assignment module 106 may assign the facets to the groups in a variety of ways. In some examples, assignment module 106 may assign each of the facets of the candidate security events to one of multiple groups of facets to create permutations of the facets on a random basis such that each of the facets is randomly assigned to one of the multiple groups. In other examples, assignment module 106 may assign each of the facets to one of multiple groups on a semi-random or non-random basis. For example, assignment module 106 may use a predefined, user-defined, and/or arbitrary ordering or formula for assigning the facets to the multiple groups.

Figure 4:
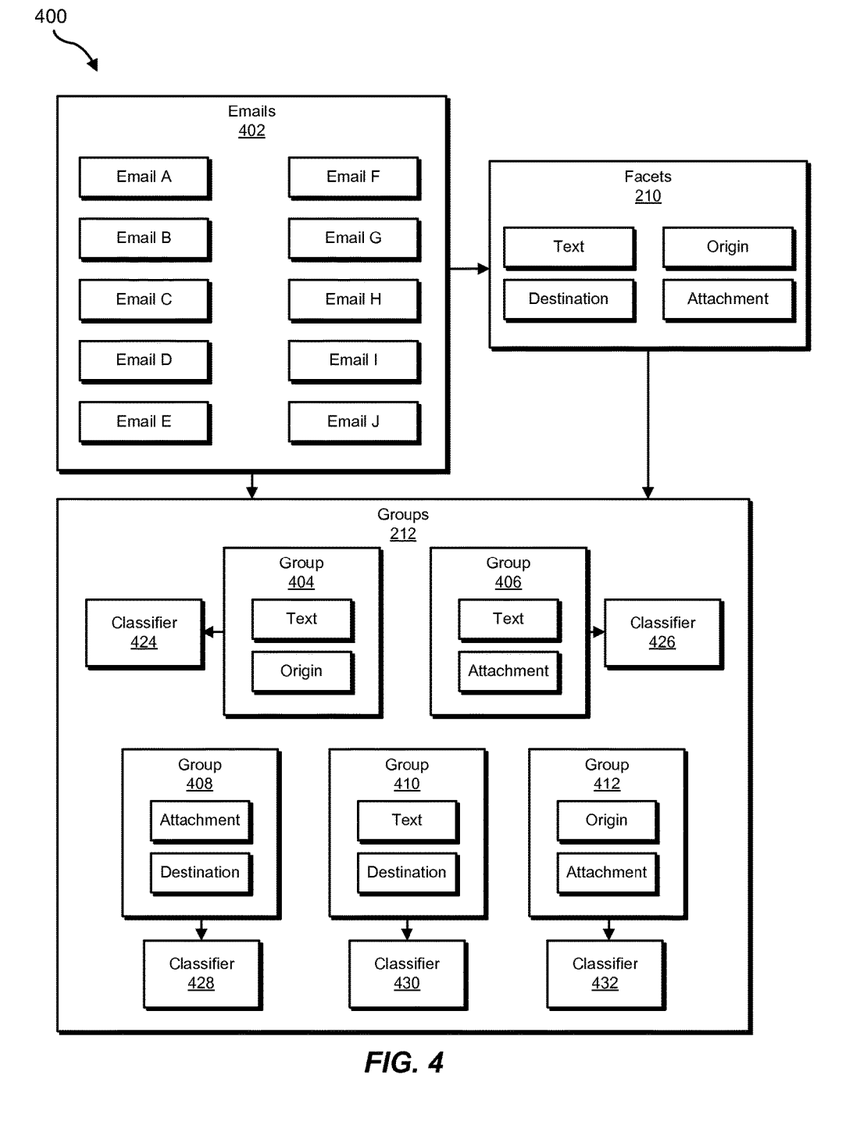
FIG. 4 is a block diagram of exemplary emails, facets, and groups involved in a system for detecting security events.

FIG. 4 illustrates a block diagram 400 that includes emails 402, facets 210, and groups 212. As shown in FIG. 4, emails 402 may include an email A, an email B, an email C, an email D, an email E, an email F, an email G, an email H, an email I, and an email J. Notably, each of these emails may include values for one or more fields or facets 210, such as text, origin, destination, and attachment, as also discussed above in more detail. As further shown in FIG. 4, assignment module 106 may assign subsets or permutations of the facets to one of groups 212, including a group 404, a group 406, a group 408, a group 410, and a group 412. Notably, each of these groups contains a different subset or permutation of facets 210. Similarly, system 200 and/or a human expert (e.g., an expert from a vendor of a corresponding security software product) may define a similarity algorithm for each of the unique groups within groups 212, as discussed further below. Comparison module 108 and/or generation module 110 may, for each group, then calculate similarity scores between each of emails 402 using the respective similarity algorithm, thereby generating a corresponding nearest neighbor graph on which a weak classifier is built, such as a classifier 424, a classifier 426, a classifier 428, a classifier 430, and a classifier 432, as further shown in FIG. 4.

At step 306, one or more of the systems described herein may compare, for each group of facets, the candidate security events according to a similarity algorithm that indicates similarity between the candidate security events. For example, comparison module 108 may, as part of server 206 in FIG. 2, compare, for each group of facets 210, the candidate security events according to a similarity algorithm that indicates similarity between the candidate security events.

As used herein, the term "similarity algorithm" generally refers to any algorithm or formula for determining a degree or measurement of similarity between two candidate security events. Notably, each group within groups 212 may use a different or unique similarity algorithm that detects similarity according to the different or unique facets that define the respective group. For example, a group based on facets of email origin and email destination may measure similarity along those dimensions. In contrast, a group based on facets of text and attachments may measure similarity along those dimensions. The various permutations of the facets and the corresponding similarity algorithms may result in different nearest neighbor graphs with different weights between the nodes from one graph to the other, because the nodes and their connections indicates similarity according to different similarity algorithms, as discussed above.

Comparison module 108 may compare the candidate security events in a variety of ways. Notably, for each group, comparison module 108 may compare each of candidate security events 230 with each other using the respective similarity algorithm for that group. For example, comparison module 108 may compare each candidate security event with every other remaining candidate security event to determine similarity scores between the initial candidate security event and every other remaining candidate security event. Comparison module 108 and/or generation module 110 may then rank or order the remaining candidate security events to determine the nearest neighbor in terms of similarity.

Moreover, comparison module 108 may compare candidate security events along the dimensions or facets that are specific to the group. For example, comparison module 108 may omit comparisons on other dimensions or facets that are not specific to the group. In one concrete example, if a group includes the facets of email origins but does not include the facet of email attachments, then comparison module 108 may compare candidate security events 230 with each other, for that group, along the dimensions of email origins but not along the dimensions of email attachments. Furthermore, comparison module 108 may generate the similarity algorithms itself using artificial intelligence and/or may receive the similarity algorithms from human experts (e.g., in cooperation with the human experts). For example, the similarity algorithm may note an alphanumeric distance between strings of text (e.g., the entire string, each corresponding character, and/or subsets of the string) such as email addresses. The similarity algorithm may similarly note a numeric distance between all characters or subsets of numbers such as IP addresses. The similarity algorithm may also note distance between numerical values such as email size or complexity. Moreover, the similarity algorithm may weight different facets within the same group the same (e.g., unweighted) and/or differently (e.g., in proportion to a degree to which one facet is estimated to be more accurate or helpful than another facet in detecting security threats).

At step 308, one or more of the systems described herein may generate, for each group of facets, a weak classifier for detecting security events based on a nearest neighbor graph that connects each node of the graph to a nearest neighbor according to the respective similarity algorithm. For example, generation module 110 may, as part of server 206 in FIG. 2, generate, for each group of groups 212 of facets 210, a weak classifier from among weak classifiers 214 for detecting security events based on a nearest neighbor graph that connects each node of the graph to a nearest neighbor according to the respective similarity algorithm.

As used herein, the term "weak classifier" generally refers to any imperfect, initial, and/or prototype classifier that generates an imperfect or initial classification or security score for a candidate security event. In other words, the weak classifier constitutes a type of function that takes a candidate security event as an input and generates an initial classification or security score as an output. After generating the initial classification, system 200 may apply each of the weak classifiers for each of groups 212 to a single candidate security event (e.g., to some or all of the candidate security events in sequence) to obtain a stronger finalized security score as distinct from the initial security score from the weak classifier. The weak classifier may form a rule based decision tree and/or perform a generalized linear regression. In some examples, generation module 110 may map the output of the weak classifier to a probabilistic decision by fitting a sigmoid function to the output.

As used herein, the term "nearest neighbor graph" generally refers to a graph as in graph theory (e.g., a K nearest neighbor graph) that includes nodes corresponding to candidate security events and connections or edges between the nodes that indicate a number of most similar nodes to a specified single node. For example, generation module 110 may generate nearest neighbor graphs for each of groups 212 that specify a single nearest neighbor for each node (e.g., where each graph includes each of the candidate security events). Alternatively, generation module 110 may generate nearest neighbor nodes for each of groups 212 that specify the two (or three, or four, or N) nearest neighbor nodes for each of groups 212. Notably, as used herein, the term "near" or "nearest" refers to distance along the dimension of similarity defined by the corresponding similarity algorithm for the respective group, as discussed further above. Moreover, generation module 110 may modify or adjust the similarity algorithm to decide instances of "ties" where two pairs of nodes share the same similarity score. Additionally, generation module 110 may modify or adjust the similarity algorithm to result in an undirected nearest neighbor graph (e.g., where each node connects to only one other node).

Figure 5:
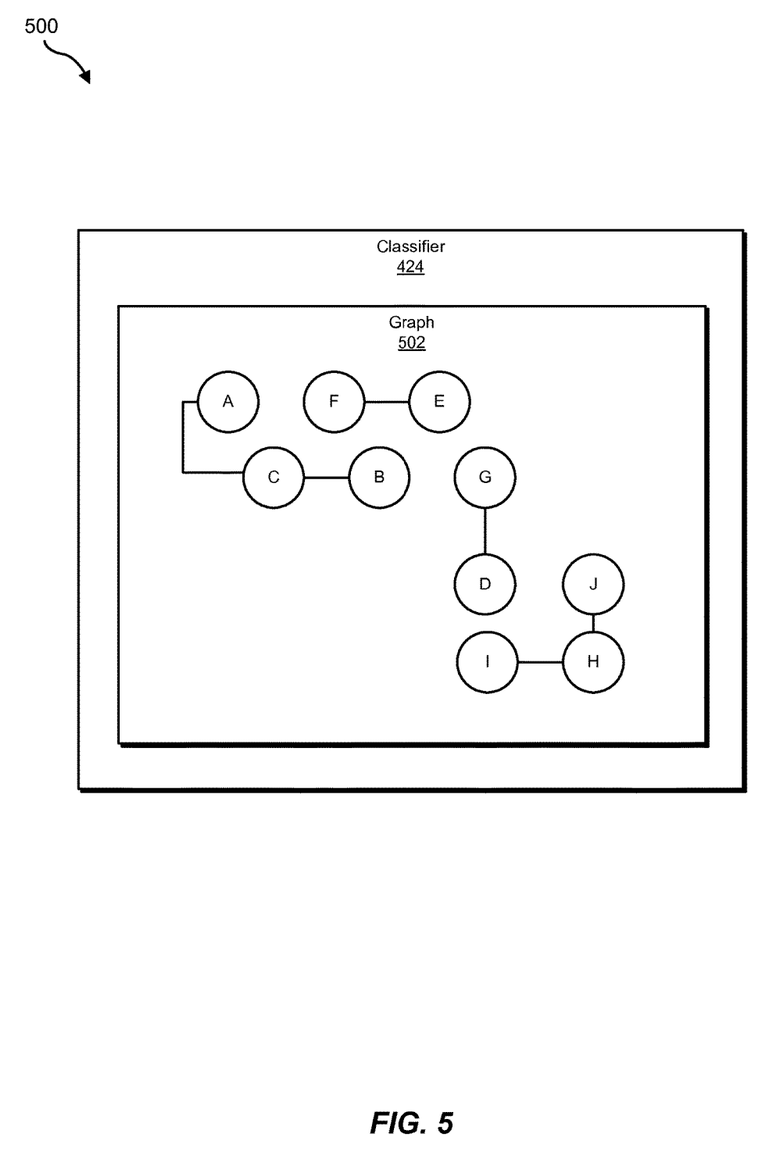
FIG. 5 is a block diagram of an exemplary nearest neighbor graph involved in a system for detecting security events.

Generation module 110 may generate the weak classifier in a variety of ways. FIG. 5 shows a block diagram 500 of classifier 424 including a graph 502. Notably, classifier 424 is merely one of the five classifiers shown in FIG. 4, each of which may correspond to a graph that resembles graph 502 (e.g., each featuring all ten emails) but that also illustrates a unique set of connections and/or connection weights based on the differences between different similarity algorithms, as discussed above. In some examples, generation module 110 may generate the weak classifier by applying machine learning systems, such as HADOOP and/or SPAR, to candidate security events 230 and/or the corresponding groups and nearest neighbor graphs.

In the example of FIG. 5, graph 502 may form four different clusters: email A, email C, and email B; email F and email E; email G and email D; and email I, email J, and email H. The connections between nodes in graph 502 may indicate the nearest neighbor to each node in terms of the similarity score according to the similarity algorithm, as discussed above.

In one embodiment, generation module 110 may generate, for each group of facets, the weak classifier by tuning parameters of the weak classifier. In general, for labeled data points (e.g., ground truth emails), generation module 110 may tune the parameters according to classical supervised learning. Furthermore, for unlabeled data points, generation module 110 may tune parameters of the weak classifier by forcing a degree of similarity between a security score for a node of the nearest neighbor graph and a security score of a neighbor of the node (or multiple nearest neighbors) to satisfy a similarity threshold. For example, if a candidate security event corresponding to email A in FIG. 5 is connected to a neighbor, email C, and email C has been labeled by the vendor as a ground truth email classified as malicious, then generation module 110 may tune the classifier to bias or adjust the security score for email A toward a classification as malicious (or simply propagate the classification of malicious from email C to email A). In some examples, generation module 110 may measure similarity using geodesic distance on the graph, which may be proportional to co-occurrence probability of security threats.

In other examples, generation module 110 may generate parameters of the weak classifier by minimizing, for unlabeled data points, a level of information entropy for security scores assigned to nodes of the nearest neighbor graph. For example, if the weak classifier would otherwise provide a score for a candidate security event, such as email A, that would cause a level of information entropy for the entirety of graph 502 to cross the threshold of information entropy, then generation module 110 may adjust the weak classifier to bias the security score for email A in a direction that results in a lower level of information entropy that no longer crosses the threshold. In general, the weak classifier may reference the graph when determining how to classify or score a candidate security event.

Moreover, as discussed above, system 200 and/or the vendor or human expert may initially seed candidate security events 230 with ground truth security events that the system has previously classified or given known security scores. The ground truth values for the security events may serve as the seed or source from which the remainder of classifications or security scores propagate or arise, as discussed above (e.g., by basing a new security score for a candidate security event on a security score of a ground truth neighbor in proportion to the calculated degree of similarity or distance between them). Moreover, the systems and methods herein may beneficially reduce the number of ground truth security events needed to accurately classify a large portion of candidate or unlabeled security events, as further discussed above.

Notably, in alternative embodiments, no ground truth values may be available and/or no new security scores may arise from ground truth values (e.g., because the ground truth data points cluster together without forming connections with unclassified data points). In these cases, human experts and/or autonomous clustering algorithms may nevertheless identify prototypes or clusters within the nearest neighbor graph. The human experts may then categorize the prototypes or clusters and build appropriate classifiers or other rule-based protection mechanisms.

In one embodiment, generation module 110 may perform, after performing an initial round of tuning and then performance module 112 applying the combination of the weak classifiers, a subsequent round of tuning that begins with security scores resulting from applying the combination of the weak classifiers. In other words, after the performance of step 310 (discussed below), method 300 may return to step 308 to further tune the weak classifier based on initial values for the candidate security events that were set by performance module 112 applying the combination of weak classifiers. Accordingly, the systems and methods herein may repeat or iterate (e.g., until a measured level of change between iterations of weak classifiers and/or security scores crosses a minimum threshold) thereby creating a feedback loop such that the output of a previous iteration becomes an input to a subsequent iteration. Notably, steps 302-310 (and permutations of these) may form a semi-supervised learning stage of method 300 as distinct from a probability decision fusion stage of step 310.

At step 310, one or more of the systems described herein may perform a remedial action in response to classifying a candidate security event as a security threat by applying a combination of the weak classifiers for the groups of facets to the candidate security event. For example, performance module 112 may, as part of server 206 in FIG. 2, perform a remedial action in response to classifying a candidate security event as a security threat by applying a combination of weak classifiers 214 for groups 212 of facets 210 to the candidate security event.

As used herein, the term "security threat" generally refers to a candidate security event that has received a classification or security score indicating that the event constitutes or represents a vulnerability, attack, and/or malicious action (or other malware or spear phishing activity) within a network computing environment. For example, the term "security threat" may refer to a candidate security event that received a security score that satisfies a threshold for malicious activity along a dimension or scale that measures maliciousness.

As used herein, the term "remedial action" generally refers to any action that a computing system or security software product may take autonomously, automatically, or semi-automatically to protect a user in response to detection of the security threat. Examples of remedial actions may include warning users, blocking emails or email addresses, blocking active content within emails, blocking or editing links within emails, rerouting web traffic away from links within spear phishing emails, and/or notifying authorities, etc.

As used herein, the phrase "applying a combination of the weak classifiers" generally refers to applying each of the weak classifiers (e.g., in sequence) and then combining the output from each of the weak classifiers. For example, each of the weak classifiers may provide a vote on whether to categorize a candidate security event as benign or malicious. Moreover, each of the votes or inputs from the respective weak classifiers may receive the same weight (e.g., be unweighted and result in an average classification or security score) or differently weighted (e.g., in proportion to a degree to which one weak classifier is estimated to be more accurate or helpful than another weak classifier).

Performance module 112 may perform a remedial action and/or apply the combination of weak classifiers in a variety of ways. In some examples, performance module 112 may apply the combination of the weak classifiers for the groups of facets to the candidate security event by giving each of the weak classifiers a vote on a security score for the candidate security event. In the example of FIG. 4, each of the five weak classifiers may give a specific candidate security event, such as email A, a classification such as malicious or benign. In that case, a majority vote of three votes for malicious may overpower a minority vote of two votes for benign. Alternatively, each of the five weak classifiers may issue a granular security score (e.g., on a scale from −1 as malicious to 0 as unknown to 1 as benign). Performance module 112 may then take the weighted or unweighted average of the different security scores. Performance module 112 may also weight the different weak classifiers based on their relative strengths and/or measured or estimated accuracy or helpfulness, as discussed above, in a manner parallel to the manner in which each similarity algorithm may weight facets different than each other. The use of the granular security score may enable the system and/or vendor to rank the security threats in order of maliciousness (or confidence of maliciousness) and thereby focus resources on the most threatening or malicious events.

As explained above in connection with method 300 in FIG. 3, the disclosed systems and methods may improve on other systems for detecting security events such as spear phishing emails by enabling vendors of security software products to reduce the amount of human labor in manually attributing or labeling candidate emails. The disclosed systems and methods may also improve detection accuracy, including achieving a 0.01% false positive rate using only 1% of classified emails, as discussed further above.

Figure 6:
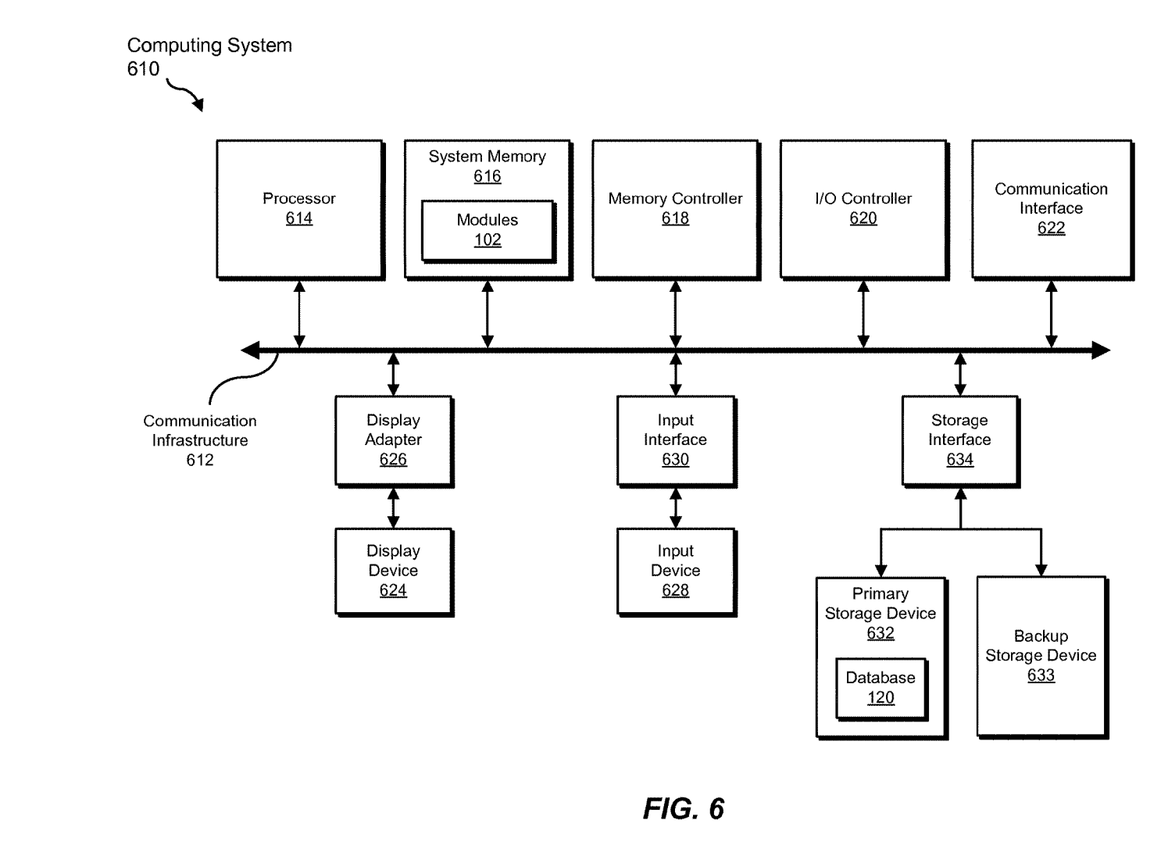
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
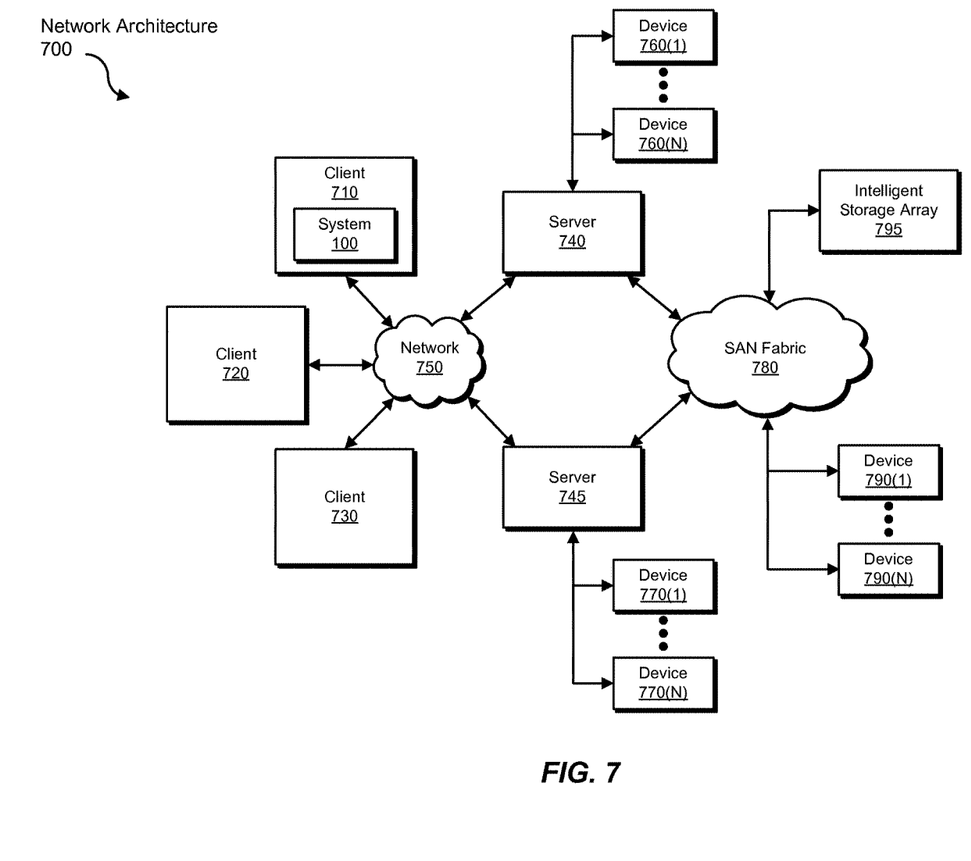
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting security events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive candidate emails and associated classifications to be transformed, transform the emails and/or classifications, output a result of the transformation to a display or other output device, use the result of the transformation to protect users from spear phishing attacks and other security threats, and store the result of the transformation to memory or other storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting security events, at least a portion of the method being performed by a computing device comprising at least one processor, the method comprising:

identifying facets of candidate security events detected by a network security system, the candidate security events comprising network messages;

assigning each of the facets of the candidate security events to one of multiple groups of facets to create permutations of the facets;

comparing, for each group of facets, the candidate security events with each other according to a similarity algorithm that indicates similarity between the candidate security events, the similarity algorithm indicating similarity according to the facets specific to the respective group;

generating, for each group of facets, a weak classifier for detecting security events based on a nearest neighbor graph that connects each node of the graph to a nearest neighbor according to the respective similarity algorithm, the nearest neighbor graph indicating the network messages as nodes; and performing, by the network security system, a remedial action in response to classifying a candidate security event as a security threat by applying the weak classifiers for the groups of facets to the candidate security event by giving each of the weak classifiers a vote on a security score for the candidate security event.

2. The method of claim 1, wherein the facets comprise a text facet.

3. The method of claim 1, wherein the network messages comprise emails.

4. The method of claim 2, wherein the facets comprise at least one of:
an origin facet;
a destination facet; and
an attachment facet.

5. The method of claim 1, wherein generating, for each group of facets, the weak classifier comprises tuning parameters of the weak classifier.

6. The method of claim 5, wherein tuning parameters of the weak classifier comprises forcing a degree of similarity between a security score for a node of the nearest neighbor graph and a security score of a neighbor of the node to satisfy a similarity threshold.

7. The method of claim 5, wherein tuning parameters of the weak classifier comprises minimizing a level of information entropy for security scores assigned to nodes of the nearest neighbor graph.

8. The method of claim 5, further comprising performing, after performing an initial round of tuning and then applying the weak classifiers, a subsequent round of tuning that begins with security scores resulting from applying the weak classifiers.

9. The method of claim 1, wherein the nearest neighbor graph forms different clusters of nodes.

10. The method of claim 1, wherein assigning each of the facets of the candidate security events to one of the multiple groups of facets to create permutations of the facets is performed on a random basis such that each of the facets is randomly assigned to one of the multiple groups.

11. A system for detecting security events, the system comprising:
an identification module, stored in memory, that identifies facets of candidate security events detected by the system, the candidate security events comprising network messages;
an assignment module, stored in memory, that assigns each of the facets of the candidate security events to one of multiple groups of facets to create permutations of the facets;
a comparison module, stored in memory, that compares, for each group of facets, the candidate security events with each other according to a similarity algorithm that indicates similarity between the candidate security events, the similarity algorithm indicating similarity according to the facets specific to the respective group;
a generation module, stored in memory, that generates, for each group of facets, a weak classifier for detecting security events based on a nearest neighbor graph that connects each node of the graph to a nearest neighbor according to the respective similarity algorithm, the nearest neighbor graph indicating the network messages as nodes;
a performance module, stored in memory, that performs a remedial action in response to classifying a candidate security event as a security threat by applying the weak classifiers for the groups of facets to the candidate security event by giving each of the weak classifiers a vote on a security score for the candidate security event; and
at least one physical processor configured to execute the identification module, the assignment module, the comparison module, the generation module, and the performance module.

12. The system of claim 11, wherein the facets comprise a text facet.

13. The system of claim 11, wherein the network messages comprise emails.

14. The system of claim 12, wherein the facets comprise at least one of:
an origin facet;
a destination facet; and
an attachment facet.

15. The system of claim 11, wherein the generation module generates, for each group of facets, the weak classifier by tuning parameters of the weak classifier.

16. The system of claim 15, wherein the generation module tunes parameters of the weak classifier by forcing a degree of similarity between a security score for a node of the nearest neighbor graph and a security score of a neighbor of the node to satisfy a similarity threshold.

17. The system of claim 15, wherein the generation module tunes parameters of the weak classifier by minimizing a level of information entropy for security scores assigned to nodes of the nearest neighbor graph.

18. The system of claim 15, wherein the generation module performs, after the generation module performing an initial round of tuning and then the performance module applying the weak classifiers, a subsequent round of tuning that begins with security scores resulting from applying the weak classifiers.

19. The system of claim 11, wherein the nearest neighbor graph forms different clusters of nodes.

20. A non-transitory computer-readable medium comprising one or more computer-readable instructions that, when executed by at least one processor of a computing device, cause the computing device to:
identify facets of candidate security events detected by a network security system, the candidate security events comprising network messages;
assign each of the facets of the candidate security events to one of multiple groups of facets to create permutations of the facets;
compare, for each group of facets, the candidate security events with each other according to a similarity algorithm that indicates similarity between the candidate security events, the similarity algorithm indicating similarity according to the facets specific to the respective group;

generate, for each group of facets, a weak classifier for detecting security events based on a nearest neighbor graph that connects each node of the graph to a nearest neighbor according to the respective similarity algorithm, the nearest neighbor graph indicating the network messages as nodes; and perform, by the network security system, a remedial action in response to classifying a candidate security event as a security threat by applying the weak classifiers for the groups of facets to the candidate security event by giving each of the weak classifiers a vote on a security score for the candidate security event.

* * * * *